March 10, 1953 W. BORBERG 2,630,738
MOTION-PICTURE MACHINE SHUTTER ADJUSTMENT
Filed Nov. 25, 1949 4 Sheets-Sheet 1

INVENTOR.
WILLY BORBERG
BY James B Byer
ATTORNEY

March 10, 1953 W. BORBERG 2,630,738
MOTION-PICTURE MACHINE SHUTTER ADJUSTMENT
Filed Nov. 25, 1949 4 Sheets-Sheet 3

INVENTOR.
WILLY BORBERG
BY James B. Boyer
ATTORNEY

March 10, 1953 W. BORBERG 2,630,738
MOTION-PICTURE MACHINE SHUTTER ADJUSTMENT
Filed Nov. 25, 1949 4 Sheets-Sheet 4

INVENTOR.
WILLY BORBERG
BY James B. Boyer
ATTORNEY

Patented Mar. 10, 1953

2,630,738

UNITED STATES PATENT OFFICE 2,630,738

MOTION-PICTURE MACHINE SHUTTER ADJUSTMENT

Willy Borberg, Astoria, N. Y., assignor to International Projector Corporation, Bloomfield, N. J., a corporation of Delaware Application November 25, 1949, Serial No. 129,316

7 Claims. (Cl. 88—19.3)

This invention relates to motion picture projecting machines, and more particularly to a novel combined means to properly frame the film image relatively to the projection aperture, and to correspondingly adjust the usual shutter synchronously with the framing of the image film, the invention constituting an improvement on U. S. Patent to Porter, 1,041,345, dated October 15, 1912.

It is customary in this art to thread the leading end of a reel of film drawn from the upper supply reel, around a continuously running upper sprocket, the sprocket holes formed along one or both edges of the film engaging the teeth of the continuously running sprocket which draws the film off the upper or supply reel. The leading end of the film is then drawn down past the projection aperture through a film gate and trap which holds the film in place and guides it past the film aperture, the film then being led around an intermittently rotated feed sprocket located just below the gate, and thence around a lower continuously rotating sprocket, from which the film may be led to a winding reel, or in the event the machine is equipped for sound, the film passes from the lower continuously rotating sprocket into the soundhead, where it travels around the usual drum to be scanned by the photoelectric cell, and thence around two sprockets and past the lower fire valve to the takeup magazine where the film is wound on a reel.

The beam from a projection light located behind the projection aperture passes through the projection aperture and film, and through a lens system in front of the apertured film gate to project the film images on the screen.

The rate of feed of the film by the intermittent film feeding and the rotation of the shutter must be synchronized in timed relation to enable the shutter to pass across the projection aperture at each pull down step of the film past the aperture, to prevent image projection on the screen during the film feeding operation.

In threading the film through the projecting machine particular care is taken to accurately position a film frame or picture image in exact register with the projection aperture so that the selected film frame and each succeeding frame presented by the intermittent feed sprocket, to the projection aperture, shall lie with its respective upper and lower frame lines just above and just below the corresponding upper and lower edges of the projection aperture.

Notwithstanding such care, it may be that because of the speed at which the operator worked in threading the film, he may have failed to correctly register the film frames with the projection aperture, or a faulty patch may later disarrange the normal succession of film frames, in which cases, the picture images projected on the screen are said to be "out of frame" since the frame lines will show, or in more pronounced cases the upper part of one film frame and the lower part of the adjacent frame will be simultaneously flashed on the screen.

Heretofore means have been devised to quickly correct this undesirable condition by providing a film framing mechanism operable by the projectionist to control the intermittent film feed so as to accelerate or retard the feed until the images are again in frame without stopping the machine.

This acceleration or deceleration may be effected in several ways depending upon the type of intermittent film feed employed.

However, any alteration in the feed of the film must be accompanied by a corresponding alteration in the rotation of the shutter to maintain the film feed and shutter rotation in phase, and the present invention is designed as an improvement upon the devices heretofore devised.

The prior art discloses synchronizing mechanisms employing slidable helically or spirally threaded gears meshing with similarly threaded non-slidable shutter driving gears to compensate for the angular displacement between the intermittent movement and the shutter. Adjustment of the slidable gear axially of its companion gear is resorted to only when the film has been misthreaded, or when a misplaced patch dislocates the evenly spaced feed of the film frames so that the frames are out of register with the projection aperture. These incidents occur infrequently and, hence, the intermeshing teeth of the slidable gear and of the non-slidable gear at their particular areas of contact become "run-in." By axially sliding one of the gears relatively to the other, a new toothed area on one of the gears is brought into engagement, and the gears in their new relative adjustment may be noisy until, in turn, they become run-in, that is, until the gears accommodate themselves to each other.

Furthermore, the provision of a pair of gears, one of which is adjustably slidable axially of the other, necessitates the provision of one long gear to enable a variation of at least ninety degrees in the rotation of the shutter and of the intermittent movement. This, in turn, not only takes up space, but also involves greater expense, time and care in the manufacture of the long helical gear.

One object of the present invention is to provide a synchronizing mechanism of a different type from the foregoing, the invention eliminating the use of inter-engaged slidable and non-slidable gears, and substituting for the slidable gear, a helical external spline in fixed relation to the shaft to rotate with the latter, and an internal spline in constant engagement with the external spline, and arranged to slide relatively thereto, to adjust the angular relation of the shutter simultaneously with, and to the same extent as, the film framing mechanism. This novel arrangement avoids the disadvantages of the former structures and provides a much more readily operated device which is less liable to get out of order and require repairs.

Heretofore considerable strain was placed on the key between the slidable gear and its shaft, necessitating a sufficiently strong key to afford a factor of safety in addition to the actual load, and this, in turn, required the provision of a heavier or larger shaft.

Thus, in the means heretofore devised, an unusual amount of force or effort was required to effect the adjustment of the shutter, due to the fact that there was provided what might be termed a "closed" gear train from the motor, not only to the shutter shaft, but also to the entire film feeding mechanism so that each mechanism would operate synchronously and at predetermined speeds or rates of rotation.

This condition is usually effected by providing a simple motor-driven, constant speed countershaft extending past the several individual mechanisms to be operated synchronously, and gearing the counter-shaft directly to the shafts of the several mechanisms, the driven gears being fast on the shafts of said individual mechanisms.

Obviously an attempt to cause an acceleration or a deceleration of any of the individual mechanisms by imparting thereto an additional increment of movement in the direction of its normal rotation, in the one case, or by attempting to retard such rotation in the other case, will be resisted by the entire train of gearing during the continuance of such attempt because of the intergeared relation of each individual mechanism to the common motor-driven drive shaft.

In the film feeding mechanism, this disadvantage has been overcome by well-known mechanism not commercially practical for use in connection with the shutter mechanism.

The present invention, therefore, is designed to provide a simple and practical solution to eliminate the setting up of back-thrust or over-running stresses on the shutter driving mechanism and on the entire gear train, the essential feature of which includes the provision of a drive gear for the shutter shaft, which gear is journaled on the shaft, whereby the shutter shaft is substantially free of its drive gear to enable the shaft to accelerate or to decelerate relatively to the constant speed of rotation of the drive gear, and counter-shaft.

Another object is the provision of novel means constituting a part of the synchronizing mechanism for effecting a minute or vernier adjustment of the shutter drive to exactly time the shutter in consonance with the intermittent film feed during the actual operation or running of the machine whereby to avoid the appearance of "ghosts" or streaks in the picture images projected on the screen.

Other objects and advantages will be more fully set forth in the following description and particularly pointed out in the claims.

In the accompanying drawings.

As heretofore stated, the present invention is particularly designed for the purpose of enabling the simultaneous adjustment or regulation of separate operating mechanisms, the movements of which mechanisms are to coincide at one or more points in their repeated operations. As illustrating one of its uses, the invention is disclosed as applied to a motion picture projecting machine wherein it is desired to control the constantly rotating shutter so as to cause it to cut off or intercept the projection light from the screen one or more times during each step of feed of the successive film frames or picture images past the projection aperture, and to uncover the light beam at the instant that the picture image is at rest, to prevent the projection of a blurred image on the screen because of the movement of the film, it being obvious that the same result would be attained by cutting off or blocking the light beam at a point in front of the projecting lens.

Figure 1:
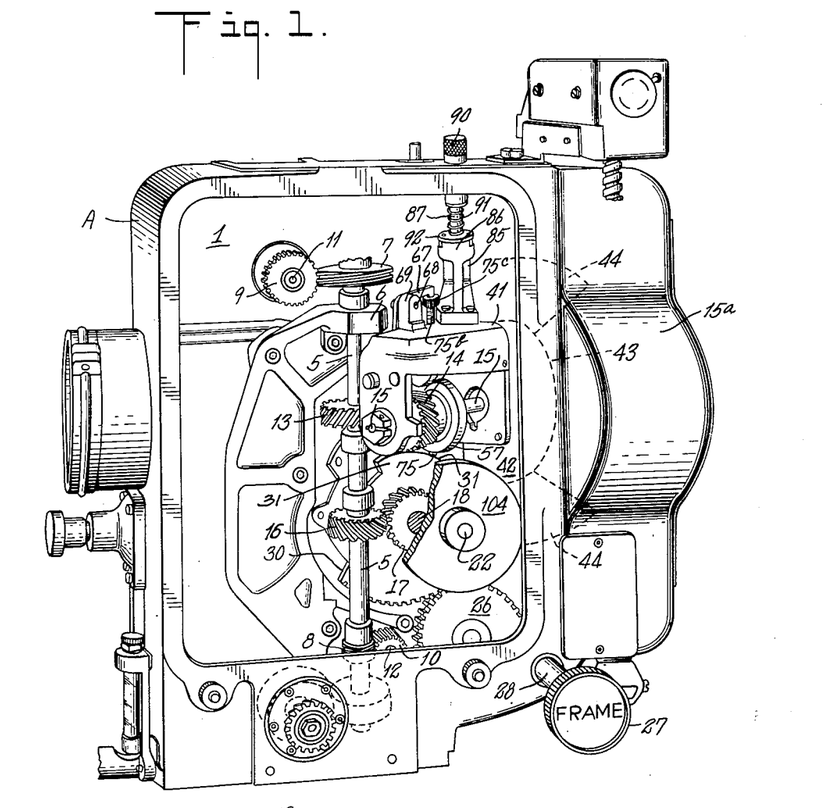
Fig. 1 is a perspective view of the non-operating side of the projector head showing the control of the shutter drive by the film framing mechanism.

The well known Simplex motion picture projecting machine selected as an example to illustrate one embodiment of the invention includes a projection head A, Fig. 1, the interior of which is divided by a vertical partition wall 1 into two substantially similar compartments. The left-hand compartment, known as the non-operating compartment, is the one shown in the accompanying drawings and houses the mechanisms for driving the upper and lower continuous film feed sprockets, the fire shutter control, the light beam shutter drive and the drive for the intermittent film feed sprocket, as shown in U. S. patent to Porter, 1,041,345, October 15, 1912, and indicated in U. S. patent to Dina, 1,746,385, February 11, 1930. Power from a motor (not shown) is transmitted to a vertical counter-shaft 5 extending from top to bottom of the non-operating compartment and supported in bearings 6, one only being shown. Upper and lower helical gears 7 and 8 fast on the counter-shaft mesh with similar gears 9 and 10 secured to the respective upper and lower continuous feed sprocket shafts 11 and 12. The counter-shaft 5 also carries a helical gear 13 meshing with a gear 14 loosely mounted on a shutter shaft 15, the associated mechanism of which will be more fully referred to hereinafter.

Figures 9, 10, 11:
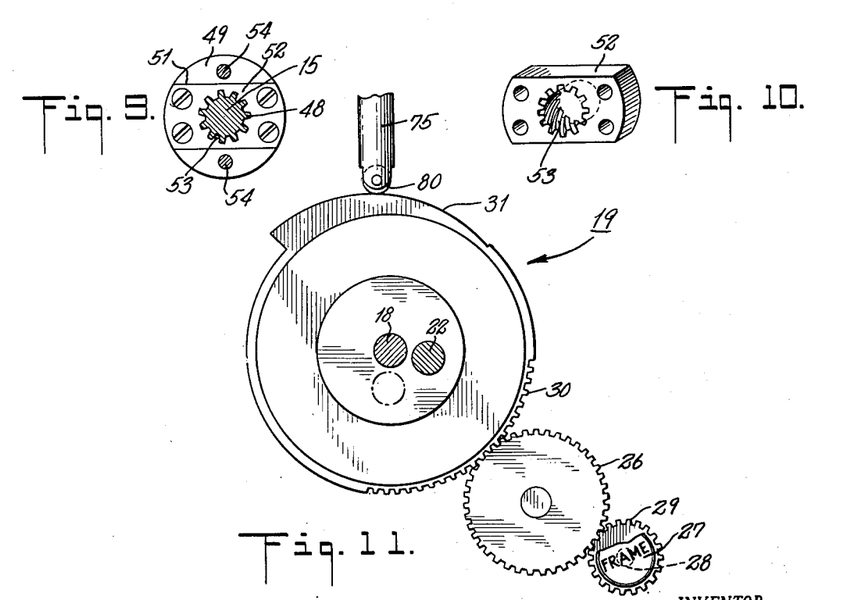
Fig. 9 is a detail view in side elevation of the spline and its support.
Fig. 10 is a detail perspective of the spline only.
Fig. 11 is a fragmentary detail view in side elevation of the manual control common to the intermittent movement and the shutter drive.
Figure 12:
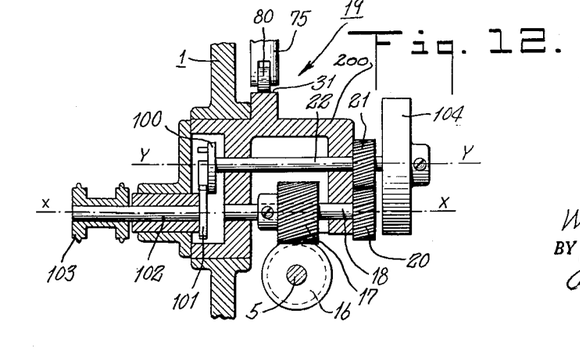
Fig. 12 is a vertical sectional view of the intermittent movement and cam follower of the film feed adjusting mechanism.

Another helical gear 16 on the counter-shaft 5 meshes with a like gear 17 fast on the outer end of a jack shaft 18 constituting a part of a well known intermittent drive, conventionally indicated in Figures 11 and 12. The jack shaft 18 is journaled along the axis of rotation X—X (Fig. 12) of the intermittent drive around which the intermittent drive casing 200, journaled in the partition wall 1, drive is bodily rotated in framing film. A second gear (Fig. 12) fast on the jack shaft meshes with a gear 21 fast on a cam shaft 22 journaled in parallelism with the jack shaft on axis Y—Y, and eccentrically of the axis X—X of rotation of the intermittent movement. The outer end of cam shaft 22 carries a flywheel 104 and the inner end of the shaft carries the usual Geneva cam 100, which engages a Geneva star wheel 101 fast on the inner end of an intermittent or star wheel shaft 102 journaled along the axis of rotation of the intermittent movement. The opposite end of the star wheel shaft carries an intermittent film feed sprocket 103 which pulls down the film strip frame by frame.

Should mis-framing of the film occur for any reason, means is provided to enable the projectionist to manually rotate the intermittent movement about the longitudinal axis X—X of the jack shaft 18, whereby to partially rotate the eccentrically journaled cam shaft 22 about, or relatively to the jack shaft, which manual rotation bodily shifts the intermittent cam 100 around the star wheel in one direction or the other, and since this manual adjustment to reframe the film is made during the film feeding operation the effect is to advance or retard the film depending upon the direction of rotation of the housing.

To effect this adjustment for re-framing purposes, the projectionist turns a framing knob 27 (Figs. 1 and 11) fast on the end of a shaft 28 projecting out from both sides of the projector head A. The shaft 28, journaled in suitable bearings in the projector head, carries a gear 29 meshing with an intermediate gear 26, which in turn, meshes with an arcuate toothed segment 30 formed on a concentric area of the periphery of a cam plate 31 fast with the usual casing 200 in which the intermittent movement is mounted. Rotation of the framing knob 27 bodily rotates the cam plate 31 and the casing around the jack shaft 18 and the alined star wheel 101 as a center, the cam shaft in the casing 22 moving bodily through an arc around the jack shaft.

The foregoing mechanism is well known in the art and constitutes a part of this invention only insofar as it co-acts therewith to attain the novel objects.

It is common practice to provide a rotating shutter located either between the projection light and film, or between the lens and the screen, or in both positions, to cut off the light from the screen during the time the film is being stepped from frame to frame. The shutter must be synchronized with the operation of the film feed mechanism so that a shutter blade will be interposed in front of the light beam masking the beam to prevent light from reaching the screen during the successive movements of the film, and to unmask the light beam the instant that the film movement ceases.

Obviously, adjustment of the film feeding mechanism to re-frame or for other purposes, independently of the shutter drive, would disarrange this timing.

The present invention is designed to improve the shutter driving means, and the means to synchronize the shutter and the film feeding mechanism to enable simultaneous adjustment of the shutter driving mechanism with, and to the same extent as, the film feed, the adjustment being conveniently effected, for example, incident to the adjustment of the intermittent movement by the projectionist.

The shutter driving or rotating shaft 15 (Figs. 3 and 4), heretofore referred to, is journaled in bearings 40 seated in alined openings formed in the arms of an inverted U-shaped frame 41, one arm of which U-shaped frame is rigidly secured to an angular face 42, Fig. 1 of the rear wall of the non-operating compartment. The shutter shaft 15 projects through the angular face of the rear wall of the projector head, into the shutter housing 15a, a suitable shutter 43, Figs. 1 and 2, being secured to such projecting end of the shaft and so located in relation to the optical axis of the light beam that the unmultilated portions of its angular flange 44 will intercept the light beam.

One of the novel features of this invention resides in the means provided for transmitting power from the counter-shaft 5 to the shutter shaft 15.

Heretofore, as shown in Porter, 1,041,345, and Dina, 1,748,385, above mentioned, as well as others, the intermediate helical gear driven from the counter-shaft was slidably keyed on a driven shaft arranged parallel with the shutter shaft. The slidable gear engaged a non-slidable spiral gear conveniently formed on the shutter shaft, and the slidable gear was shiftable along the spiral gear.

One disadvantage of this arrangement is that since adjustment of the slidable gear relatively to the non-slidable gear is or should be of infrequent occurrence, the spiral gear and the non-slidable gear "wear in" at some particular toothed area in the length of the non-slidable gear, that is, a free non-binding contact is formed between the slidable gear and a particular area of the non-slidable gear. When it becomes necessary to shift the spiral gear relatively to the non-slidable gear to correct a mis-framed film, the slidable gear is brought into contact with a new and unworn area of the non-slidable gear, which contact is liable to be noisy.

Another disadvantage of the former structure is that the spiral gear must be relatively long to accommodate the entire range of adjustment of which the intermittent movement is capable, generally some 90 degrees, and a long gear presents greater manufacturing difficulties in regard to maintaining the required accuracy of tooth form.

A further disadvantage of those former devices wherein the slidable gear is keyed or feathered on the shaft is that not only is the driving strain brought to bear on the comparatively weak key or feather, but to this is added the frictional strain set up when traversing the slidable gear relatively to the nonslidable gear.

These disadvantages are eliminated in the present invention, first by mounting a freely rotatable, axially non-slidable gear on the shutter shaft 15 thus avoiding the use of a key as a coupling member between the shaft and said gear; and secondly, by providing an axially adjustable spline mechanism on the shaft, with a slidable power transmitting connection between the non-slidable gear and the adjustable spline.

Figures 3, 5:
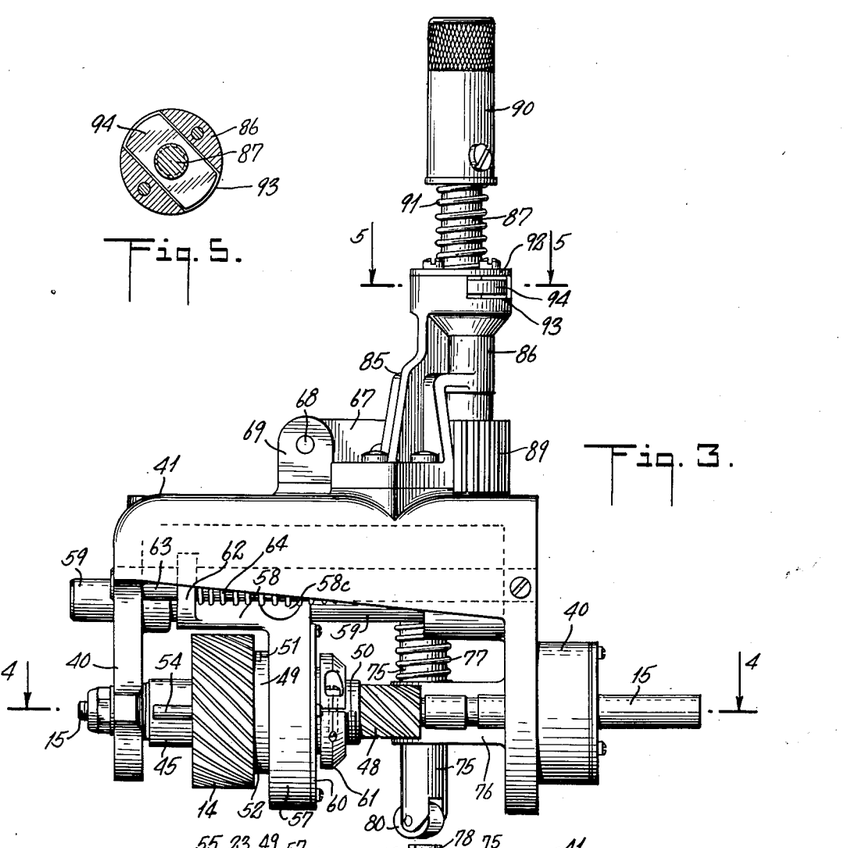
Fig. 3 is a front elevation of the same mechanism.
Fig. 5 is a horizontal sectional view taken on line 5—5 of Fig. 3, showing a detail of the vernier adjustment for the shutter.
Figure 4:
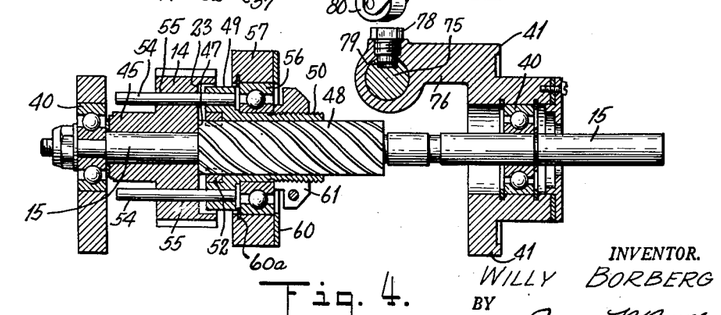
Fig. 4 is a horizontal sectional view of the shutter-driving means taken on line 4—4 of Fig. 3.

To these and other ends, the spiral or helical gear 14 is journaled to rotate on an unthreaded portion near one end of the shutter driving shaft 15, the gear being held against axial displacement in any convenient manner, as by contact of its hub 46, Figs. 3 and 4, with the ball bearing 40 seated in the adjacent arm of the inverted U-shaped frame 41 on the one side, the opposite face of the drive gear contacting a shoulder 47, Fig. 4, on the shaft 15, said shoulder being, for instance, the adjacent end of an external spiral helix or spline 48 cut into an enlarged portion of the periphery of the shutter driving shaft. This same opposite or inner face of the gear 14 is circularly recessed centrally thereof, as at 23, which reduces the width of its bearing on the shutter shaft, so as to enable a reduction in the length of the shutter shaft 15, the external spline 48 extending into the space encircled by the recessed portion of the helical gear 14.

As a novel means to transmit power from the non-slidable gear 14 to the shutter shaft, there is provided a guiding and supporting member or spline-carrier comprising a spline-carrying disc 49 having a tubular sleeve 50, extending axially from one side of the disc in line with an opening extending centrally through the disc. Furthermore, the outer face of the disc 49 is diametrically recessed, as at 51, in which recess an oblong spline plate 52 (Figs. 9 and 10) seats, having a centrally located, internal helically-threaded bore 53 constituting an internal spline in line with the central opening in the disc, to encircle and mesh with the external spline 48. Preferably, the bore 53 is completely threaded circumferentially, as shown in Fig. 10, to snugly fit and conform to the external spline, it being obvious that a less number of threads might be formed in the spline plate bore and on the shaft, respectively.

Rigid guide pins 54 project from the recessed face of the disc at points near the outer circumference of the disc, and in parallelism with the drive shaft, which pins enter holes 55 drilled through the web of the non-slidable gear 14 adjacent the outer circumference of the circular recess 23 in the gear.

The circular recess 23 is of sufficient diameter to accommodate the disc 49 and spline plate 52, and it will be noted that the pins 54 engage the driven gear 14 at points remote from the shutter shaft 15 to enable the drive gear to exert a greater leverage or torque on the spline-carrier 49 because of the pin-and-hole connection 54, 55 between the non-slidable gear 14 and the splined disc, spaced apart from the shutter shaft 15. It is clear that rotation of the non-slidable helical gear 14 will be transmitted through the pins 54 to the spline-carrying disc 49 and spline plate 52 which, in turn, will drive the shutter shaft 15, due to the engagement of the internal helical spline 53 with the external spline 48 on the shutter shaft.

Figures 2, 6:
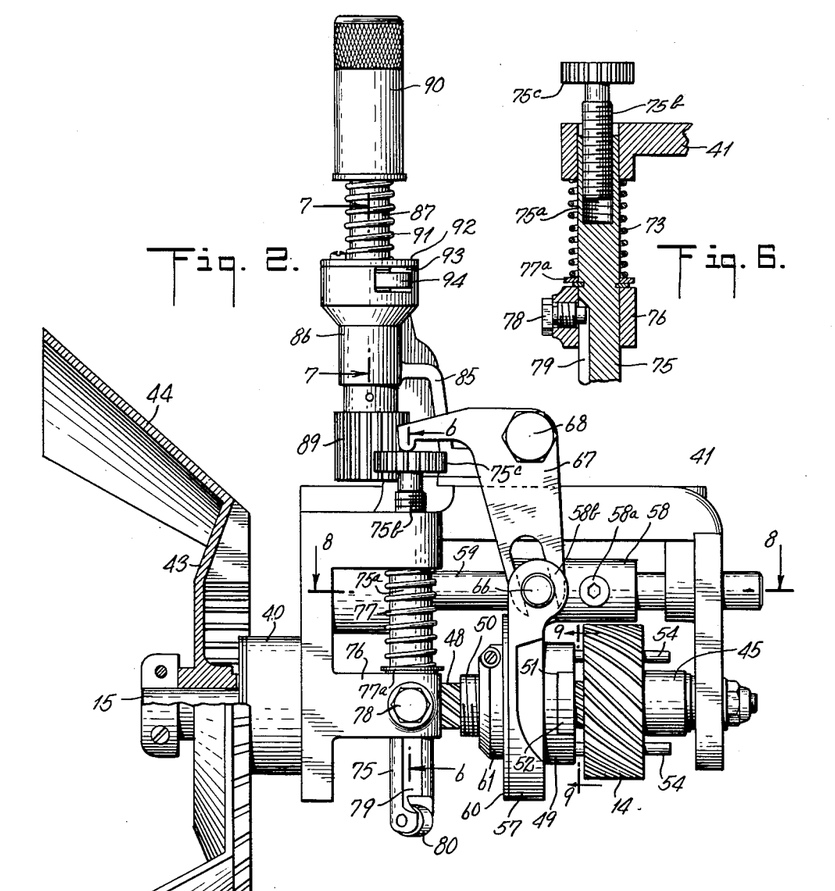
Fig. 2 is a rear elevation of the shutter drive and its controls.
Fig. 6 is a view in vertical section taken on line 6—6 of Fig. 2, showing another detail of the vernier adjustment for the shutter.

As a means to control the position of the internal spline relatively to the external spline; to maintain the internal spline in any of its adjusted positions; and to enable the projectionist to advance or retard the rotation of the shutter shaft 15 simultaneously with an advance or retraction of the film, and in conformity therewith when re-framing the film, the spline-carrier 49, 50 is mounted in bearings 56, Fig. 4, in a yoke or collar 57, Figs. 2-4, depending from a tubular slide 58 (Figs. 1, 3 and 8) through which passes a supporting rod 59 above and parallel with the shutter shaft, the supporting or pilot rod extending between, and slidable in bearings in, the opposite arms of the U-shaped frame 41. The tubular slide 58 is fastened to the rod 59 by a set screw 58a. An annular retainer plate 60 (Figs. 1, 3 and 4) fastened to one side face of the annular yoke 57 maintains the ball bearing 56 in place on one side of the yoke, against displacement in one direction, the opposite side of the ball race abutting a snap ring 60a to prevent displacement of the ball bearing in the opposite direction. A clamping nut 61 threaded on the outer end of the tubular sleeve 50 extending through the ball bearing 56 maintains the unit assembled. A laterally extending perforated ear 62, Figs. 3 and 8, on the slide 58 rides on a guide rod 63 extending between and supported in the opposite arms of the U-shaped frame, to one of which arms the guide rod is releasably secured, to maintain the slide 58 and yoke 57 with the spline-carrier 49 in parallel relation with the shutter shaft 15 and slidable rod 59 against cocking, skewing or cramping. A compression spring 64 on the guide rod 63, compressible between the ear 62 and an arm of the U-shaped frame, acts to return the spline-carrier with its slide to or towards one limit of its travel.

Figure 8:
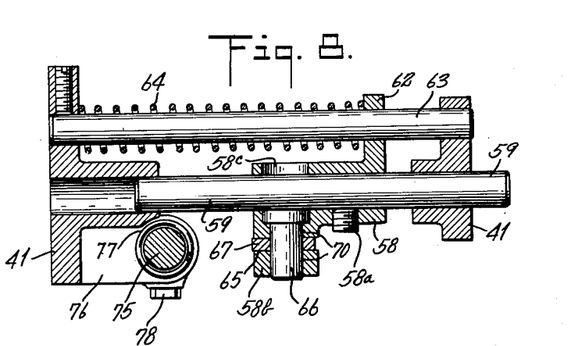
Fig. 8 is a horizontal sectional view taken on line 8—8 of Fig. 2, to illustrate the manner of mounting the spline-slide, and means to guide the same.

A boss 58b, Figs. 2 and 8, projecting laterally from the slide 58 is vertically slotted, as at 65, to accommodate the lower forked end of a bell crank 67 pivoted at 68 to a lug 69, Fig. 3, projecting upwardly from the inverted U-shaped frame 43. A hole 70 (Fig. 8) is drilled through the slide 58 transversely of its bore which accommodates the supporting rod 59, said hole 70 extending longitudinally through the boss 58b to receive a stud 66, the hole 70 being counter-bored to a point where the boss 58b joins the slide to form a seat for the head of the stud 66 inserted into the bore in the boss 58b through the enlarged counterbored inner end 58c of the hole 70 drilled through the slide and the boss. The stud 66 extends across the slot 65 in position to be embraced by the forked arm of the bell crank 67. The stud is, of course, inserted in its seat in the boss prior to threading the slide 58 on the slidable supporting rod 59 so that the rod abuts the head of the stud 66 to hold the stud in its seat. The remaining arm of the bell crank lever 67 extends laterally towards the inner end of the U-shaped frame to engage the upper end of a vertical plunger 75 (Figs. 1, 2 and 6) mounted in alined apertures formed through the web of the U-shaped frame 41 and through a guide projection 76 projecting from the inner arm of the U-shaped frame. The lower end of the plunger rests on the eccentric edge of the cam plate 31, Figs. 1 and 11, which, it will be recalled, is rotated through an arc upon manual operation of the framing knob 27. A spring 77, Figs. 2, 3 and 6, encircling the plunger 75 and bearing at one end against a washer 77a fixed on the plunger and at its opposite end against the connecting bridge of the inverted U-shaped frame, yieldingly maintains the lower end of the plunger in contact with the eccentric periphery of the cam 31 in any position the latter may assume, the spring 64 operating through the slide 58 and stud 66 to hold the fingered arm of the bell crank 67 yieldingly engaged with the plunger.

As thus far explained, it will be clear that rotation of the framing knob 27 to correct a misframed film by rotation of the intermittent film feeding mechanism in one direction or the other, will also rotate the cam plate 31 rigidly connected to the casing of the intermittent feed mechanism. Depending on the direction of rotation of the framing knob, the shutter control cam 31 will present a higher or a lower surface to the lower end of the plunger 75. Assuming the spline plate 52 and its carrier 49, 50 to be at that limit of its movement wherein the spline plate and carrier have entered the recessed non-slidable gear 14, as shown in Figs. 3 and 4, at which time the lower end of the plunger 75 rests on the lower portion of the cam plate 31 against which the plunger bears under tension of the follower spring 77, the framing knob 27, when turned in one direction, will rotate the cam 31 to force the plunger upwardly, further tensioning the spring 77 and rocking the bell crank 67 to slide the spline carrier 49, 50 and internal spline 52 along the spiral external spline 48 to impart an angular increment of movement to the shutter shaft simultaneously with the angular displacement of the film feeding mechanism, and to the same relative extent, to maintain the shutter rotation in synchronism with the correction of the film feed. The supporting rod 59 of the tubular slide 58 shifts axially in its bearings in the arms of the inverted U-shaped frame 41, with the slide 58 which is secured to the rod. With the parts in their newly adjusted positions, rotation of the framing knob 27 in the opposite direction, while adjusting the framing, also "slacks off" the shutter shaft control cam 31, that is, rotates the cam 31 to present a lower portion of the cam to the spring-pressed plunger 75 which follows down the receding cam edge, under the tension stored in the spline-return spring 77, whereupon the spline return spring 77 operates to shift the spline-carrying slide 58 and spline plate 52 with its internal spline 53 back towards the spiral shutter shaft drive gear 14, thereby, through the traverse of the internal spline along the external spline 48, imparting a partial rotation to the shutter shaft 15 and shutter 43 corresponding to the axial extent of shift imparted to the spline plate and to the degree of rotation imparted by the framing knob 27 to the intermittent film feeding mechanism. This partial rotation of the shutter shaft 15 in either direction relatively to the shutter shaft gear 14 is but momentary and is in addition to the continuous rotation of the shaft, as is well understood in the art.

From the foregoing, it is clear that to effect the simultaneous and synchronous adjustment of the intermittent film feed mechanism and the shutter mechanism to obtain the desired results, it is necessary that the initial relative adjustment of the two mechanisms be exact.

To this end, it is customary, when setting the shutter on its shaft in assembling the machine, to turn the machine over slowly by hand, watching the intermittent sprocket to detect the instant it starts to turn to bring the next film frame to the projection aperture. At this point, the hand operation of the machine is stopped, and the shutter applied to the outer end of the shutter driving shaft 15 where it is fastened in place with the leading portion of one of its vanes or blades just completely intercepting the light beam. Nothwithstanding the care with which this operation is performed, it sometimes occurs that, in the projection of the picture images on the screen, the shutter may not have been so exactly set as to entirely shut off the light beam from the screen during the full step movement of the film, that is, the trailing edge of the vane may have a slight lead sufficient to start to unmask the light beam an instant before the intermittent movement ceases to advance the film, or vice versa, the intermittent movement may start its advance of the film an instant before the shutter totally masks the light beam. As a result, light will seep past either the leading or the trailing edge of the vane, causing the appearance of streaks of light on the screen. Obviously, such an initial condition would continue irrespective of any adjustment possible in a framing operation. In other words, manipulation of the framing knob will not cure this defect.

Therefore, the invention includes means to enable the projectionist to rectify the foregoing defect without requiring a re-setting of the shutter on its shaft, the means so provided operating through and constituting a part of the synchronizing mechanism just described.

To these ends, it will be recalled that the projectionist, by operating the framing knob 27, controls the adjustment of the intermittent feed, and simultaneously rocks the shutter adjustment control cam 31 which imparts or permits travel of the plunger 75 in one direction or the other to shift the spline plate 52 with its internal spline plate 53 along the helical external spline 48 whereby, depending upon the extent of movement of the spline plate, determined by the extent of movement of the plunger, the desired amount of advance or retraction of the shutter travel is obtained. Thus, the extent of adjustment of the shutter advance and retraction is controlled by the extent of travel of the plunger 75 under control of the cam 31. Consequently, adjustment of the length of the plunger will effect an adjustment of the extent of advance and retraction of the shutter without affecting the adjustment of the intermittent movement and without altering the control of the framing knob 27 over both the intermittent film feeding and the shutter.

As one means to adjust the extent of additional movement forwardly or backwardly, of the shutter 43 and its shaft 15 under control of the framing knob 27, the plunger 75 is made telescopic, as by forming the plunger in two sections, one of which, 75a (see Fig. 6) is tubular in part, and in the present instance, constitutes the body portion of the plunger sliding in the alined apertures in the web of the U-shaped frame 41 and in the guide projection 76. The lower solid end of the body portion of the plunger, or an antifriction device 80 thereon, contacts the framing cam 31, the upper tubular end of such body portion being internally threaded to accommodate the threaded stem of a screw 75b, the head 75c at the outer end of the screw being conveniently formed as a pinion against the upper face of which the fingered end of the horizontal arm of the bell crank 67 rests, due to the tension of the slide-restoring spring 64. A set screw 78, mounted in the guide projection 76 for the plunger, enters a key way 79 extending longitudinally of the plunger 75 to prevent rotation of the body portion when the telescopic screw 75b is rotated, while permitting longitudinal movement of the plunger assembly. Obviously, either of the two parts 75a and 75b of the plunger may be tubular.

Figure 7:
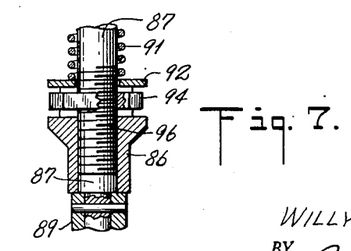
Fig. 7 is a detail view in vertical section taken on line 7—7 of Fig. 2, showing the limiting means for the vernier adjustment.

To enable the projectionist to make a fine or vernier adjustment of the shutter, a pedestal 85, Figs. 2, 3 and 7, is mounted on the web of the U-shaped frame 41, the pedestal including a vertical barrel 86, the bore of which serves as a support and guide for a vertically projecting spindle 87 which passes through the barrel and to a point adjacent the pinion 75c. The lower end of the spindle carries a long pinion 89 in mesh with the shorter pinion 75c on the plunger, it being immaterial which is the longer. The upper end of the spindle 87 projects upwardly through the top of the projection head A, and is provided with a removable knurled cap 90 to facilitate manual operation of the spindle and its long pinion 89, which turns the shorter pinion 75c and screw 75b in one direction or the other, to run the adjustable portion 75b of the plunger 75 into or out of the tubular portion of the plunger and thereby shorten or lengthen the plunger assembly, the set screw 78 preventing rotation of the body portion 75a of the plunger during such adjustment.

A suitable friction, as a compressed spring 91, between the knurled cap 90 and a cover plate 92 closing the enlarged outer or upper end of the barrel 86, yieldingly retains the spindle in any of its adjusted positions to prevent accidental displacement and, through the intermeshing pinions 89, 75c on the spindle and plunger, respectively, also retains the telescopic adjustment of the sections 75, 75b, of the plunger in their set positions.

It is obvious that the spindle 87 does not shift axially, and as a convenient means to limit its rotation in either direction to restrict the adjustment of the extensible and contractible portion of the plunger 75 within reasonable bounds, the enlarged upper end of the barrel 86 is diametricaly slotted, as at 93, Figs. 2, 5 and 7, to accommodate the opposite ends of a travelling nut 94 having an internally threaded bore engaging a threaded section 96 of the spindle 87. The depth of the diametric slots 93 determines the extent of rotation permitted the spindle and consequently the extent of adjustment of the length of the plunger 75.

In use, rotation of the spindle 87 will tend to turn the travelling nut 94, but the latter is prevented from turning by the seating of the ends of the travelling nut in the diametrically opposed slots 93 in the enlarged end of the barrel 86. Thus confined, the travelling nut 94 travels longitudinally of the spindle 87 as far in either direction as the depth of the slots permit, the cover plate 92 closing the outer ends of the slots to limit the outward travel of the nut or stop 94. An extreme adjustment of the shutter of, say, ten degrees is sufficient to allow the shutter to eliminate the appearance of light streaks on the screen.

In setting up the machine initially, it is customary to adjust the vernier control to a median position to enable the projectionist when checking the mechanism under operating conditions to lengthen or shorten the plunger 75 depending upon whether the light streaks on the screen stream upwardly or downwardly from the picture image. Lengthening or shortening the plunger assembly 75 operates to press the outer end or head of the plunger in minute increments against, or withdraw it from, the horizontal arm of the bell crank 67. In the first instance, the bell crank is rocked to shift the spline plate 52 farther from the loose spiral gear 14, and along the external spline 48 to slightly rotate the shutter shaft 15 and shutter 43 in one direction. Shortening the plunger enables the spline-return spring 64 to force the slide 58 back towards the shutter shaft gear 14, causing the internal spline 52, 53 to partially rotate the shutter shaft and shutter in the opposite direction.

It is evident that lengthening or shortening the plunger in the manner explained does not shift the body portion 75a of the plunger, the compression spring 77 maintaining the lower end of the plunger in contact with the cam surface 31 at all times. Also, the power transmitting pins 54 are of sufficient length to maintain engagement with the shutter shaft gear 44 in any operating position of the spline.

Changes may be made in the form and arrangement of the several parts described without departing from the spirit and scope of the appended claims, or of the invention.

What I claim as new, is:

1. A shutter adjustment for a motion picture machine comprising a shutter shaft; a shutter fixed thereto; adjusting means for the shutter, including a means axially movable relatively to the shutter shaft; and a second means fixed on the shutter shaft and with which the axially movable means cooperates to adjust the angular position of the shutter; lever means for determining the axial position of the axially movable means; a telescopic plunger, including complementary threaded sections, in engagement with the lever means; a pinion fastened to one of said complementary threaded sections; manually adjustable means having a pinion in engagement with said first-named pinion, whereby rotation of said manually adjustable means rotates one of said complementary threaded sections relatively to the other to vary the over-all length of said plunger to minutely adjust the position of said axially movable means and the angular position of the shutter.

2. A shutter adjustment for a motion picture machine, comprising a shutter shaft; a shutter affixed thereto; adjusting means for the shutter, including a means axially movable relatively to the shutter shaft, and a seocnd means fixed on the shutter shaft and with which the axially movable means cooperates to adjust the angular position of the shutter; lever means for determining the axial position of said axially movable means; a telescopic plunger, including complementary threaded sections in engagement with said lever means; manually operable means to control the axial movement of the plunger for effecting relatively major adjustments of the angular position of the shutter; a pinion fastened to one of said complementary threaded sections of the plunger; a second manually adjustable means, including a threaded shank; a pinion on the shank in mesh with said first-mentioned pinion whereby rotation of said second manually adjustable means rotates one of said complementary threaded sections relatively to the other to vary the over-all length of the plunger and minutely adjust the position of said axially movable means and the angular position of the shutter.

3. A shutter adjustment for a motion picture machine, having a shutter shaft; a shutter affixed thereto; adjusting means for the shutter, including a means axially movable relatively to the shutter shaft; and a second means fixed on the shutter shaft, and with which the axially movable means cooperates, to adjust the angular position of the shutter; lever means for determining the axial position of the axially movable means; a telescopic plunger, including complementary threaded sections, in engagement with said lever means; a pinion fast to one of said complementary threaded sections of the plunger; a manually rotatable shank; a pinion on the shank in mesh with the first-named pinion; a stationary support for the rotatable shank, whereby rotation of the shank and its pinion rotates one of the complementary threaded sections of the plunger relatively to the other to vary the over-all length of the plunger and minutely adjust the position of the axially movable means and the angular position of the shutter; and means to limit the rotation of the shank.

4. A shutter adjustment for a motion picture machine having a shutter shaft; a shutter fixed thereon; adjusting means for the shutter, including a means axially movable relatively to the shutter shaft; and a second means fixed on the shutter shaft, and with which the axially-movable means cooperates, to adjust the angular position of the shutter; lever means for detering the axial position of the axially movable means; a telescopic plunger, including complementary threaded sections, in engagement with said lever means; a pinion fast to one of said complementary threaded sections of the plunger; a manually rotatable threaded shank; a pinion on the shank in mesh with the first-named pinion; a stationary, apertured support through which the shank passes, whereby rotation of the shank and its pinion rotates one of the complementary threaded sections of the plunger relatively to the other to vary the over-all length of the plunger and minutely adjust the position of the axially-movable means and the angular position of the shutter; the stationary shank support being radially slotted; and a follower nut mounted on the threaded shank and extending into the radial slot to limit rotation of the shank by contact with the walls of the slot.

5. A shutter adjustment for a motion picture machine, having a shutter shaft; a shutter fixed thereto; adjusting means for the shutter, including a means axially movable relatively to the shutter shaft; and a second means fixed on the shutter shaft, and with which the axially movable means cooperates to adjust the angular position of the shutter; lever means for determining the axial position of the axially movable means; a telescopic plunger, including complementary threaded sections, in engagement with said lever means; a pinion fast to one of said complementary sections of the plunger; a manually rotatable shank; a pinion on the shank in mesh with the first-named pinion; a stationary support in which the shank rotates to thereby rotate one of the complementary sections of the plunger relatively to the other to vary the over-all length of the plunger and minutely adjust the position of the axially movable means and the angular position of the shutter; and means to restrain the remaining complementary section of the plunger against rotation.

6. A shutter adjustment for a motion picture machine, comprising a shutter shaft; a shutter driven by the shaft; adjusting means for the shaft and shutter, including a means axially movable relatively to the shutter shaft; and a second means fixed on the shutter shaft, and with which the axially movable means cooperates to adjust the angular position of the shutter; means, including a lever, for determining the axial position of the axially movable means; a telescopic plunger, including complementary threaded sections, in engagement with the lever; a pinion fastened to one of the complementary threaded sections; manually adjustable means having a pinion in mesh with the first-named pinion, whereby rotation of the manually adjustable means rotates one of the complementary threaded sections relatively to the other to vary the over-all length of the plunger for minutely adjusting the position of the axially movable means and the angular position of the shutter; and means to prevent accidental disengagement of the telescoped complementary threaded sections.

7. A shutter adjustment for a motion picture machine, comprising a shutter shaft; a shutter driven by the shaft; adjusting means for the shaft and shutter, including a means axially movable relatively to the shutter shaft; and a second means fixed on the shutter shaft, and with which the axially movable means cooperates to adjust the angular position of the shutter; means, including a lever, for determining the axial position of the axially movable means; a telescopic plunger, including complementary threaded sections, in engagement with the lever; a pinion fast on one of the complementary threaded sections; manually adjustable means, having a pinion in mesh with the first-named pinion, whereby rotation of the manually adjustable means rotates one of the complementary threaded sections relatively to the other to vary the over-all length of the plunger for minutely adjusting the position of the axially movable means and the angular position of the shutter; and means to limit the extent of axial movement of the complementary threaded sections relatively to each other; one of the pinions being of sufficient length to maintain engagement with its co-acting pinion at any point in the extent of relative axial movement permitted the complementary threaded sections of the telescopic plunger.

WILLY BORBERG.

REFERENCES CITED

The following references are of record in the file of this patent:

UNITED STATES PATENTS

| Number | Name | Date |
| --- | --- | --- |
| 1,209,584 | Hughes | Dec. 19, 1916 |
| 1,298,394 | Proctor | Mar. 25, 1919 |
| 1,407,905 | Wenderhold | Feb. 28, 1922 |
| 2,045,260 | Berggren | June 23, 1936 |
| 2,131,850 | Wall | Oct. 4, 1938 |
| 2,211,808 | Boecking | Aug. 20, 1940 |

FOREIGN PATENTS

| Number | Country | Date |
| --- | --- | --- |
| 23,275 | Great Britain | of 1908 |
| 148,924 | Great Britain | July 10, 1920 |